Figure 1:
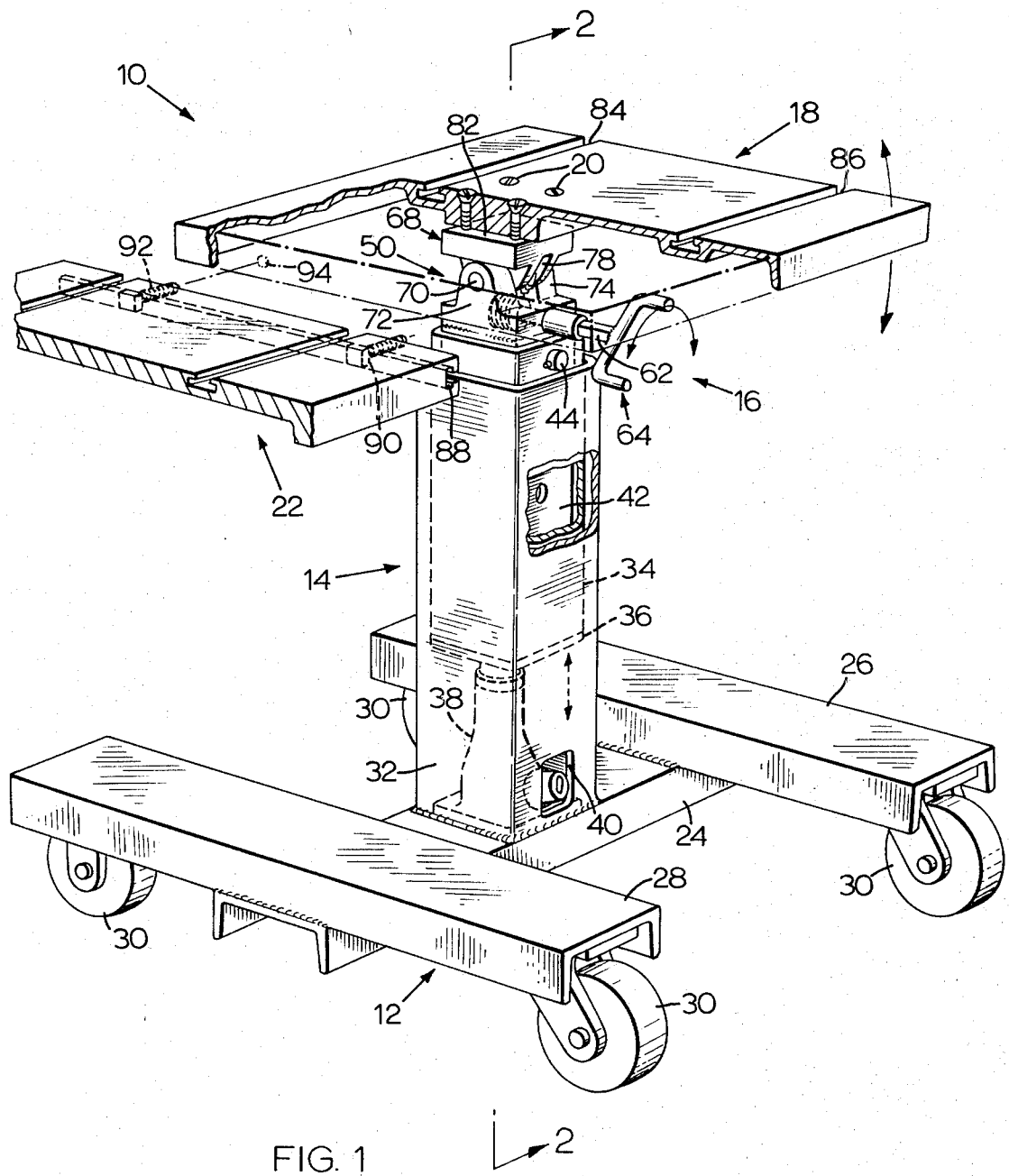

United States Patent
Poizner

[15] 3,690,608
[45] Sept. 12, 1972

[54] ADJUSTABLE STAND
[72] Inventor: Julius Poizner, Downsview, Ontario, Canada
[73] Assignee: Newark Tool & Machine Limited, Weston, Ontario, Canada
[22] Filed: July 7, 1970
[21] Appl. No.: 52,965

[52] U.S. Cl. ................248/371, 108/7, 248/354 S, 248/405, 248/407
[51] Int. Cl. .........................................F16m 11/10
[58] Field of Search..........248/7, 185, 371, 404, 405, 248/407; 108/7, 147

[56] References Cited

UNITED STATES PATENTS

| 390,199 | 10/1888 | Blackmore | 248/404 X |
| 496,739 | 5/1893 | Kennedy | 248/407 UX |
| 2,683,067 | 7/1954 | Hartman | 108/7 |

FOREIGN PATENTS OR APPLICATIONS

| 327,802 | 4/1930 | Great Britain | 248/185 |

Primary Examiner—William H. Schultz
Attorney—Rogers, Bereskin & Parr

[57] ABSTRACT

An adjustable stand for supporting attachments adjacent a machine tool table. The stand has a base on casters for easy movement, and a telescopic upright extends upwardly from the base. A tilting mechanism is attached to the top of the upright and supports an auxiliary table to which attachments may be fastened. The telescopic upright and tilting mechanism combine to permit adjustment of the height and angular position of the auxiliary table to match the position of the machine tool table.

3 Claims, 2 Drawing Figures

INVENTOR.
JULIUS POIZNER
BY
Rogers Bereskin, ¶Parr

INVENTOR.
JULIUS POIZNER

ADJUSTABLE STAND

This invention relates to an adjustable stand for coupling to a machine tool table to support stock feed attachments and the like.

Machine tools are often used with attachments which must be positioned relative to the machine tool table and supported on a combination of wedges and packing pieces to match the height of the table. Each time the attachment is to be used it must be set up using just sufficient packing and wedges to support the weight of the attachment without stressing the machine tool table.

An example of such an attachment is the device used for feeding strip metal stock to a press. This attachment is coupled to the machine tool table and feeds a predetermined length of stock after each punching operation of the machine tool. The stock feed attachment is usually relatively large and heavy and must be positioned and removed using a light crane or the like. Also, the stock passes from one end of the table to the other and for some operations the table must be tilted transversely of the stock path thereby making it more difficult to provide proper support for the attachment.

In some present arrangements, an auxiliary table has a stock feed attachment or the like coupled to it and is held in reserve for when it is required to feed stock to a machine tool. The auxiliary table together with the attachment is fitted to the table by lifting the auxiliary table with a crane, positioning it against the machine tool table and coupling it in place using bolts. The auxiliary table is then supported using packing pieces and wedges to take the weight of the auxiliary table off the main machine tool table. This arrangement requires some skill to set up properly, and is time consuming and expensive. Also, each time the machine tool is to be used for a different stock, the auxiliary table together with the stock feed apparatus must be replaced. Thus, a crane is required each time the stock feed attachment is to be coupled to the machine tool table and also each time it is to be removed. If the crane is not available at a given time this results in costly delays and a loss of production of the machine tool.

Further disadvantages of the auxiliary tables, are that there tends to be a cantilever weight on the machine table and also that vibration tends to loosen the wedges.

One of the objects of the present invention is to provide an adjustable stand having an auxiliary table for supporting a stock feed attachment, the table being adjustable for height and tilt so that it can be positioned in alignment with a machine tool table to support a stock feed attachment or the like in proper position relative to the machine tool table.

Accordingly, in a particular preferred embodiment of the present invention, an adjustable stand is provided which includes a base on castors for easy movement, and a telescopic upright extending upwardly from the base. A tilting mechanism is attached to the top of the upright and supports an auxiliary table. The stand includes means for coupling attachments to the auxiliary table, and the telescopic upright and tilting mechanism combine to adjust the height and angular position of the auxiliary table to match the position of a machine tool table.

Figure 2:
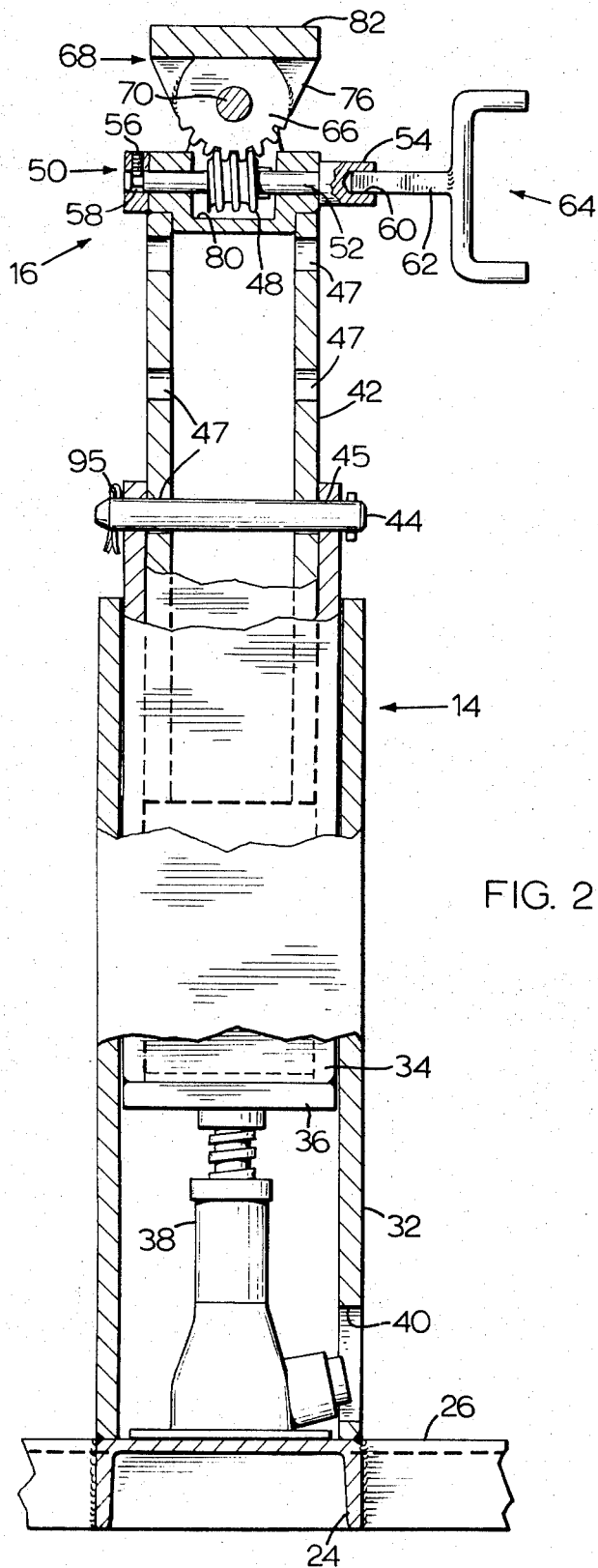

The invention will be better understood with reference to the drawings, wherein:

FIG. 1 is a partially sectioned perspective view of a stand according to the invention; and FIG. 2 is a sectional view on lines 2—2 of FIG. 1.

Reference is first made to FIG. 1 which shows a stand 10 having a base 12 on which is mounted a telescopic upright 14. A tilting mechanism 16 is attached to the upper end of the telescopic upright 14 and an auxiliary table 18 is attached by countersunk screws 20 to the tilting mechanism 16. The table 18 can be moved vertically by adjusting the telescopic upright 14, and tilted by adjusting the mechanism 16 to bring it in alignment with a machine tool table 22 so that any attachment which is supported by the table 18 is in the required position relative to the machine tool table 22.

The base 12 is of fabricated construction having a longitudinal member 24 attached to first and second transverse members 26, 28. The members 24, 26 and 28 are inverted U-sectioned channels and the base 12 is supported on 4 casters 30 which are positioned one at each end of the transverse members 26, 28. The longitudinal member 24 is positioned centrally of the members 26, 28 for stability and the telescopic upright 14 is welded to a central portion of the longitudinal member 24.

Telescopic upright 14 includes a lower or outer tubular member 32 which has a square cross-section. An intermediate tubular member 34 which also has a square cross-section is adapted to slide in the member 32 and has a bottom plate 36. A screw jack 38 is positioned under the plate 36 and on the longitudinal member 24 with an upper end of the jack 38 in contact with the bottom plate 36 for supporting the intermediate member 34. A rectangular opening 40 is provided in a longitudinal side of the lower member 32 providing access for operating the jack 38.

An upper or inner tubular member 42 of square cross-section is slidably engaged in the intermediate member 34 and is positioned therein by a transversely extending pin 44 which passes through the intermediate member 34 adjacent its upper end and through a pair of selected holes 45 in the upper member 42. The upper member has at least one other set of holes 47 spaced-apart by slightly less than the vertical travel of the jack 38 to accommodate different heights of machine tool table 22. Once the pin 44 is engaged in a selected pair of holes in the upper member 42, the table 18 can then be elevated and lowered over a range corresponding plate 36. A screw jack 38 s positioned under the plate 36 and on the longitudinal member 24 with an upper end of the jack 38 in contact with the bottom plate 36 for supporting the intermediate member 34. A rectangular opening 40 is provided in a longitudinal side of the lower member 32 providing access for operating the jack 38.

An upper or inner tubular member 42 of square cross-section is slidably engaged in the intermediate member 34 and is positioned therein by a transversely extending pin 44 which passes through the intermediate member 34 adjacent its upper end and through a pair of selected holes 45 in the upper member 42. The upper member has at least one other set of holes 47 spaced-apart by slightly less than the vertical travel of the jack 38 to accommodate different heights of machine tool table 22. Once the pin 44 is engaged in a selected pair of holes in the upper member 42, the table 18 can then be elevated and lowered over a range corresponding to the travel of the jack 38.

The tilting mechanism 16 is welded to the upper end of the member 42 and projects upwardly therefrom. The mechanism 16 includes a worm gear 48 rotatably mounted in a lower part 50. The worm gear 48 is attached by any conventional means (not shown) to a shaft 52 which passes through the lower part 50 transversely of the stand and is located at its outer end by a collar 54 and at its inner end by a locating screw 56 which engages loosely in an annular recess 58 in the shaft 52. The outer end of the collar 54 defines a square sectioned axial recess 60 for receiving a square extension 62 of a handle 64. The handle can be attached permanently to the collar 54 or inserted only when it is required to adjust the mechanism 16.

The worm gear 48 is in mesh with a gear wheel 66 which is attached to an upper part 68 so that when the worm gear 48 is rotated, the gear wheel 66 together with the upper part 68 rotate about a longitudinal axle 70. The lower part 50 includes a pair of upwardly extending, spaced-apart projections 72, 74 between which projections a downward extension 76 of part 68 projects. A slot 78 in the extension 76 houses the gear 66 and a recess 80 in the lower part 50 houses the worm gear 48. An upper surface 82 of the part 68 is machined flat to receive the auxiliary table 18 and threaded holes (not shown) are provided in the part 68 for receiving the countersunk screws 20 which pass through the table 18 and engage in the part 68.

The table 18 is of a conventional cast structure having a milled upper surface and T-slots 84, 86 extending longitudinally of the table for receiving T-bolts which connect the attachment to the table 18. The auxiliary table can be connected to the machine tool table 22 using any conventional connector such as the T-slot 88 and T-bolts 90, 92 shown on the machine tool table for connection through openings 94 in the leading end of the table 18. Suitable nuts are provided from the underside of the table 18 for attachment to the bolts 90, 92 to couple the auxiliary table 18 to the machine tool table 22.

In use, the pin 44 is first positioned in a hole in the upper member 42 to correspond with the range of height required for the table 18. This will depend on the height of the machine tool table 22, and once the pin is in place, it is unlikely that it will be removed unless the table is to be used with other machine tools. However a split pin 95 is provided in the pin 44 so that the pin can be removed when required. The stand is next moved into position adjacent the machine tool and the jack 38 and mechanism 16 adjusted until the bolts 90, 92 can be engaged in the openings 94 whereupon these bolts are fastened and the table is in engagement. The attachment can either be added at this stage or positioned in the auxiliary table before the stand is located against the machine tool table. Once the attachment has been attached to the table 18, the low cost of the stand 10 allows the attachment to be stored on the stand more or less permanently so that the attachment can be wheeled about on the stand from one machine tool to another thereby dispensing with the need for a crane.

The stand will have its major use in conjunction with machine tools having tables which tilt about a longitudinal axis, (i.e., from front to back in relation to the machine tool). However, in some instances it may be required to connect the auxiliary table to the front of the machine tool. This, however will be less usual than the former situation.

What I claim as my invention is:

1. An adjustable stand for supporting stock feed attachments and the like adjacent a machine tool table, the stand comprising:
   a base;
   a telescopic upright having upper and lower ends and attached at its lower end to the base, the telescopic upright comprises: lower, intermediate and upper members, the intermediate member being slidably engaged in the lower member, and the upper member being slidably engaged in the intermediate member, said members being restrained to substantially prevent rotation of one of the members relative to another of the members, the intermediate member defining an opening adjacent its upper end, and the upper member defining at least two openings spaced-apart vertically for selective alignment with said opening in the intermediate member; a pin for engagement in said openings to lock the upper member in said selected position in the intermediate member; a plate attached to the lower end of the intermediate member; and jack means for adjusting the vertical separation of said ends of said telescopic upright, the jack means comprising a screw jack housed in the lower member below the intermediate member and bearing against said plate so that adjustment of the screw jack results in up and down movement of the intermediate member together with the upper member;
   a tilting mechanism attached to said upper end of the telescopic upright, the tilting mechanism including an upper part and a lower part and means connecting said parts for adjusting the angular relationship of said upper part about a longitudinal axis; and
   an auxiliary table coupled to said upper part for movement therewith so that said table may be moved into a desired position by actuating said jack means and said adjusting means.

2. An adjustable stand as claimed in claim 1 in which said connecting means comprises: an axle coaxial with said longitudinal axis and pivotally interconnecting said parts; a worm gear rotatably mounted on said lower part; and a gear wheel attached to the upper part coaxially with said axle and in mesh with the worm gear whereby rotation of the worm gear results in rotation of the gear wheel and upper part about said longitudinal axis.

3. An adjustable stand as claimed in claim 2 and further comprising casters attached to the underside of the base for supporting the base to permit the stand to be moved from one location to another.

* * * * *